(12) United States Patent
Halliday et al.

(10) Patent No.: US 8,838,392 B2
(45) Date of Patent: *Sep. 16, 2014

(54) NOISE ATTENUATION IN PASSIVE SEISMIC DATA

(75) Inventors: David Fraser Halliday, Fife (GB); Everhard Muyzert, Cambridge (GB); Pascal Edme, Cambridge (GB)

(73) Assignee: WesternGeco L.L.C., Houston, TX (US)

(*) Notice: Subject to any disclaimer, the term of this patent is extended or adjusted under 35 U.S.C. 154(b) by 571 days.

This patent is subject to a terminal disclaimer.

(21) Appl. No.: 12/947,144

(22) Filed: Nov. 16, 2010

(65) Prior Publication Data

US 2011/0082646 A1    Apr. 7, 2011

Related U.S. Application Data

(63) Continuation-in-part of application No. 12/573,301, filed on Oct. 5, 2009, and a continuation-in-part of application No. 12/573,266, filed on Oct. 5, 2009, now Pat. No. 8,712,694.

(51) Int. Cl.
    *G01V 1/36*            (2006.01)
    *G01V 1/18*            (2006.01)

(52) U.S. Cl.
    CPC ............. *G01V 1/36* (2013.01); *G01V 2210/144* (2013.01); *G01V 1/189* (2013.01); *G01V 2210/32* (2013.01); *G01V 2210/3246* (2013.01); *G01V 2210/169* (2013.01); *G01V 1/366* (2013.01); *G01V 2210/123* (2013.01)
    USPC ............................................. 702/17; 367/40

(58) Field of Classification Search
    CPC ...................................................... G01V 1/366
    USPC ............................................... 702/17; 367/40
    See application file for complete search history.

(56) References Cited

U.S. PATENT DOCUMENTS

| | | | |
|---|---|---|---|
| 3,722,751 | A | 3/1973 | Bisciglia |
| 3,934,218 | A | 1/1976 | Babb |
| 4,134,097 | A | 1/1979 | Cowles |

(Continued)

FOREIGN PATENT DOCUMENTS

| | | |
|---|---|---|
| EP | 0736781 A1 | 10/1996 |
| EP | 1257849 A1 | 11/2002 |

(Continued)

OTHER PUBLICATIONS

Curtis et al., "Seismic interferometry—turning noise into signal", Sep. 2006, The Leading Edge, pp. 1082-1092 http://library.seg.org/doi/pdf/10.1190/1.2349814.*

(Continued)

*Primary Examiner* — Jonathan C Teixeira Moffat
*Assistant Examiner* — Regis Betsch

(57) ABSTRACT

Passive seismic data is collected from measurements of seismic sensors in respective sensor assemblies, where the passive seismic data is based on measurements collected during periods when no active seismic source was activated. Attenuation of surface noise in the passive seismic data is performed using data from divergence sensors in at least some of the sensor assemblies. The passive seismic data with surface noise attenuated is output to allow for performing an operation related to a subterranean structure using the passive seismic data with the surface noise attenuated.

18 Claims, 5 Drawing Sheets

(56) References Cited

U.S. PATENT DOCUMENTS

| | | | |
|---|---|---|---|
| 4,163,206 A | | 7/1979 | Hall, Jr. |
| 4,334,296 A | | 6/1982 | Hall, Jr. |
| 4,520,467 A | | 5/1985 | Berni |
| 4,554,648 A | * | 11/1985 | Greer et al. ............ 367/49 |
| 4,558,439 A | * | 12/1985 | Gudesen ............ 367/127 |
| 4,599,713 A | | 7/1986 | Rudaz |
| 4,890,264 A | | 12/1989 | Crews et al. |
| 4,979,150 A | | 12/1990 | Barr |
| 4,996,675 A | | 2/1991 | Beauducel |
| 5,555,530 A | * | 9/1996 | Meehan ............ 367/45 |
| 5,621,699 A | * | 4/1997 | Rigsby et al. ............ 367/22 |
| 5,648,938 A | | 7/1997 | Jakubowicz |
| 5,757,720 A | | 5/1998 | Soubaras |
| 6,314,371 B1 | | 11/2001 | Monk |
| 6,330,512 B1 | | 12/2001 | Thomas et al. |
| 6,381,544 B1 | | 4/2002 | Sallas et al. |
| 6,442,304 B1 | | 8/2002 | Crawley et al. |
| 6,446,009 B1 | | 9/2002 | Baeten et al. |
| 6,584,038 B2 | * | 6/2003 | Meunier ............ 367/25 |
| 6,607,050 B2 | | 8/2003 | He et al. |
| 6,894,948 B2 | | 5/2005 | Brittan et al. |
| 6,932,185 B2 | | 8/2005 | Bary et al. |
| 6,961,283 B2 | | 11/2005 | Kappius et al. |
| 7,082,079 B2 | | 7/2006 | Woo |
| 7,142,481 B1 | | 11/2006 | Metzbower et al. |
| 7,286,938 B2 | | 10/2007 | Amundsen et al. |
| 7,551,517 B2 | | 6/2009 | Berg et al. |
| 7,916,576 B2 | | 3/2011 | Beasley et al. |
| 8,520,469 B2 | | 8/2013 | Ronnow et al. |
| 2007/0104028 A1 | | 5/2007 | Van Manen et al. |
| 2008/0225641 A1 | | 9/2008 | van Manen et al. |
| 2009/0052277 A1 | | 2/2009 | Swanson |
| 2010/0100330 A1 | | 4/2010 | Burkholder et al. |
| 2010/0265797 A1 | | 10/2010 | Robertsson et al. |
| 2010/0286922 A1 | * | 11/2010 | Poletto ............ 702/17 |
| 2011/0080808 A1 | | 4/2011 | Muyzert et al. |
| 2011/0082647 A1 | * | 4/2011 | Edme et al. ............ 702/17 |
| 2011/0085417 A1 | | 4/2011 | Ronnow |
| 2011/0141849 A1 | | 6/2011 | Brittan |
| 2011/0249530 A1 | | 10/2011 | Liu |
| 2012/0081999 A1 | | 4/2012 | Halliday et al. |

FOREIGN PATENT DOCUMENTS

| | | | | |
|---|---|---|---|---|
| EP | 1454169 A1 | | 9/2004 | |
| FR | 2738642 A1 | | 3/1997 | |
| GB | 1256304 A | * | 12/1971 | ............ G01H 3/00 |
| GB | 1256304 A | | 12/1971 | |
| GB | 2456313 A | | 7/2009 | |
| WO | 03036331 A1 | | 5/2003 | |
| WO | 2005017563 A1 | | 2/2005 | |

OTHER PUBLICATIONS

Snieder et al., "Cancellation of spurious arrivals in Green's function extraction and the generalized optical theorem", Sep. 2008, Phys Rev. E 78, 036606-(1-8), http://inside.mines.edu/~rsnieder/Spurious_PRE08.pdf.*

Snieder et al., "Extracting the Green's function of attenuating heterogeneous acoustic media from uncorrelated waves", May 2007, J. Acoust. Soc. Am. 121 (5), pp. 2637-2643, http://inside.mines.edu/~rsnieder/Interf_atten07.pdf.*

Halliday et al., "Interferometric surface-wave isolation and removal", Sep.-Oct. 2007, Geophysics,vol. 72, No. 5, pp. A69-A73.*

Dey et al., "Noise suppression on geophone data using microphone measurements", 2000, CREWES, Research Report 2000, pp. 1-12, http://www.crewes.org/ForOurSponsors/ResearchReports/2000/2000-08.pdf.*

Lawton et al. "Field Tests of 3-component geophones, Part II", 1991, CREWES, Research Report 1991, pp. 1-27, http://www.crewes.org/ForOurSponsors/ResearchReports/1991/1991-01.pdf.*

Dey e al., "Noise suppression on geophone data using microphone measurements," CREWES Research Report, 2000, vol. 12: pp. 1-12, <http://www.crews.org/ForOurSponsors/ResearchReports/2000/2000-08.pdf>.

Barr, F. J. and Sanders, J. I., "Attenuation of Water-Column Reverberations Using Pressure and Velocity Detectors in a Water-Bottom Cable," SEG Annual Meeting, Oct. 1989: pp. 1-4.

Kragh, E. and Peardon, L., "Ground Roll and Polarization", First Break, Sep. 1995, vol. 13(9): pp.

Barr, F. J., "Dual-Sensor OBC Technology", The Leading Edge, Jan. 1997, vol. 16(1): pp. 45-51.

Robertsson, J. O. A. and Curtis, A., "Wavefield Separation Using Densely Deployed Three-Component Single-Sensor Groups in Land Surface-Seismic Recordings", Geophysics, Sep. 2002, vol. 67(5): pp. 1624-1633.

Karsli, H. and Bayrak, Y., "Using the Weiner-Levison Algorithm to Suppress Ground Roll", Journal of Applied Geophysics, Mar. 2004, vol. 55(3-4): pp. 187-197.

De Meersman, K. and Kendall, R., "A Complex SVD-Polarization Filter for Ground Roll Attenuation on Multi-Component Data," EAGE 67th Conference and Exhibition, Jun. 2005: pp.

Drijkoningen, G. G., "Design of Seismic Network in LOFAR: Testing at Exloo Test-Site", Jul. 2007: pp.

Drijkoningen, G. G., "Project Plan of the Seismic Application in LOFAR", Sep. 2007: pp.

Van Dalen, K. N., Drijkoningen, G. G., and Smeulders, D. M. J., "Characterization of Subsurface Parameter with Combined Fluid-Pressure and Particle-Velocity Measurements", 70th EAGE Conference & Exhibition, Jun. 9, 2008: pp. 1-5.

Edme, P. and Singh, S. C., "Receiver Function Method in Reflection Seismology", Geophysical Journal International, 2008, vol. 56(3): pp. 327-340.

Digital Sensors, ION Geophysical, 2009, <http://iongeo.com/Land_Imaging/Digital_Sensors>.

Sensor Geophoness, ION Geophysical, 2009, <http://iongeo.com/Land_Imaging/Geophones>.

Edme, P. and Singh, S. C., "Receiver Function Decomposition of OBC Data: Theory", Geophysical Journal International, 2009, vol. 177(3): pp. 966-977.

International Search Report and Written Opinion for PCT Application No. PCT/US2010/051367 dated Apr. 28, 2011: pp. 1-8.

International Search Report and Written Opinion for PCT Application No. PCT/US2010/051368 dated Apr. 28, 2011: pp. 1-11.

International Search Report and Written Opinion for PCT Application No. PCT/US2011/060328 dated Jun. 11, 2012: pp. 1-8.

Criss, "Another look at full-wave seismic imaging," first break, Jun. 2007, vol. 25: pp. 109-116.

Greensted, "The Lab book Pages: Delay Sum Beamforming an online collection of electronics information," The Lab Book Pages, Oct. 2012: pp. 1-9, <http://www.labbookpages.co.uk/audio/beamforming/delaySum.html>.

U.S. Appl. No. 12/573,266, Notice of Allowance dated Dec. 9, 2013, pp. 1-6 and attachments.

* cited by examiner

NOISE ATTENUATION IN PASSIVE SEISMIC DATA

CROSS REFERENCE TO RELATED APPLICATIONS

This is a continuation-in-part of U.S. Ser. No. 12/573,301, filed Oct. 5, 2009. This is also a continuation-in-part of U.S. Ser. No. 12/573,266, filed Oct. 5, 2009 now U.S. Pat. No. 8,712,694. Both applications are hereby incorporated by reference.

BACKGROUND

Seismic surveying is used for identifying subterranean elements, such as hydrocarbon reservoirs, freshwater aquifers, gas injection zones, and so forth. In active seismic surveying, seismic sources are placed at various locations on a land surface or sea floor, with the seismic sources activated to generate seismic waves directed into a subterranean structure.

In active seismic surveying, the seismic waves generated by a seismic source travel into the subterranean structure, with a portion of the seismic waves reflected back to the surface for receipt by seismic sensors (e.g., geophones, accelerometers, etc.). These seismic sensors produce signals that represent detected seismic waves. Signals from seismic sensors are processed to yield information about the content and characteristic of the subterranean structure.

In many cases, noise can interfere with accurate measurement of seismic waves reflected from the subterranean structure.

SUMMARY

In general, according to some embodiments, a method comprises receiving passive seismic data collected by seismic sensors in respective sensor assemblies, where the passive seismic data was measured during periods when no active seismic source was activated. Attenuation of surface noise in the passive seismic data is performed using data from divergence sensors in at least some of the sensor assemblies. The passive seismic data with surface noise attenuated is output to allow for performing an operation in relation to a subterranean structure using the passive seismic data with the surface noise attenuated.

Other or alternative features will become apparent from the following description, from the drawings, and from the claims.

BRIEF DESCRIPTION OF THE DRAWINGS

Some embodiments are described with respect to the following figures.

DETAILED DESCRIPTION

Figure 1:
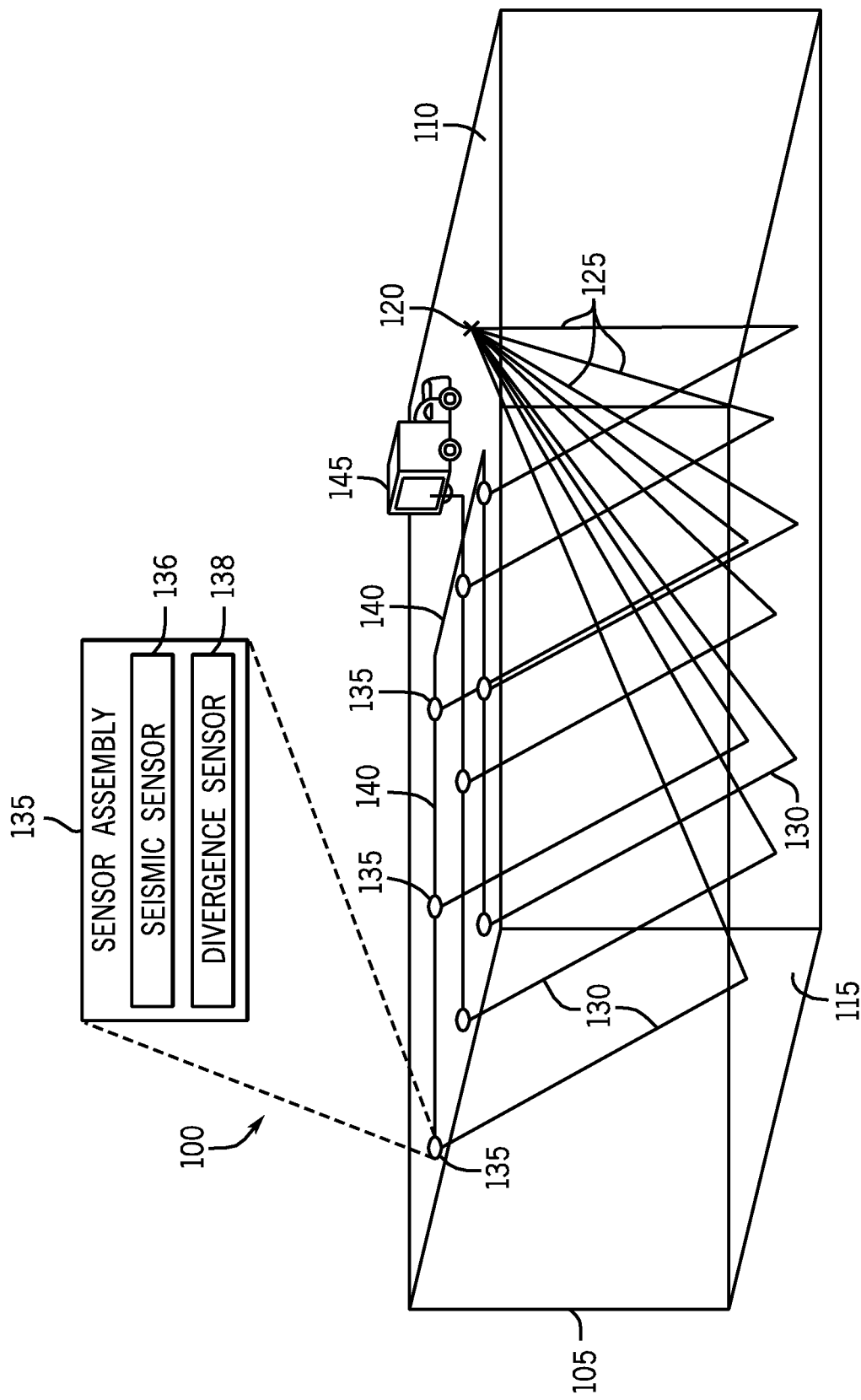
FIGS. 1 and 2 illustrate example arrangements to perform surveys of a subterranean structure in accordance with some embodiments.

As used here, the terms "above" and "below"; "up" and "down"; "upper" and "lower"; "upwardly" and "downwardly"; and other like terms indicating relative positions above or below a given point or element are used in this description to more clearly describe some embodiments of the invention. However, when applied to equipment and methods for use in wells that are deviated or horizontal, such terms can refer to a left to right, right to left, or diagonal relationship as appropriate.

Seismic data can be collected using active and passive seismic surveying of a subterranean structure. While active seismic surveying uses seismic signals produced by active seismic sources, passive seismic surveying can record seismic activity during periods between seismic source activations in the active seismic surveying.

An "active" seismic source refers to a seismic source that is controllable by a user or controller. For example, an active seismic source can be connected to the controller, with the controller being programmable to automatically activate the active seismic source, or to activate the active seismic source in response to user input. Examples of active seismic sources include vibrators (which have oscillating impact elements that move back and forth to impact a surface to cause generation of seismic waves), explosives, or any other seismic source that is able to produce discrete seismic waves under user or controller control. An active seismic source is distinguished from environmental seismic sources, such as produced by earthquakes, environmental ambient noise, and so forth. Such environmental seismic sources can also be referred to as "passive" seismic sources.

Passive seismic data can be used for performing operations in relation to a subterranean structure. For example, passive seismic data can be processed to characterize the content of the subterranean structure. Such characterization of the subterranean structure allows for a determination of presence of certain subterranean elements in a subterranean structure, where subterranean elements of interest can include hydrocarbon reservoirs, freshwater aquifers, gas injection zones, and so forth. Alternatively, passive seismic data can be used to produce a model of the subterranean structure, where the model can be a velocity model (that provides a representation of various velocities within the subterranean structure), or other types of models.

The generation of an image or model can use passive seismic interferometry (discussed further below). In other implementations, other techniques of producing an image or model using passive seismic data can be employed.

As yet another alternative, passive seismic data can be used to perform passive data reservoir monitoring, which involves monitoring of a subterranean reservoir during an operation (e.g., production or injection) relating to the reservoir. The passive seismic data provides some indication of changes in characteristics of the reservoir during the operation, which can be used to monitor the reservoir.

FIG. 1 illustrates a land-based survey arrangement 100 to perform surveying of a subterranean structure 105 in accordance with some implementations. The subterranean structure 105 is underneath a ground surface 110 and contains a reflector 115, which can represent a subterranean element of interest. The surveying performed can include active and passive surveying.

During active surveying, an active seismic source 120 can fire seismic waves 125 into the subterranean structure 105. The seismic waves 125 can include a compressional wave ("P-wave") and a shear wave ("S-wave"). The component(s) of the seismic waves 125 can be reflected and converted by the reflector 115, and the reflections 130 can be detected by multiple sensor assemblies 135.

The sensor assemblies 135 can each include a seismic sensor 136 (e.g., a geophone, an accelerometer, etc.) and a divergence sensor 138 (discussed further below). The seismic sensors 136 can generate electrical signals (measurements) representative of the received reflections 130, which provide information regarding the subterranean structure 105. The measured data can be transmitted over lines 140 (e.g., electrical lines, wireless links, optical lines, etc.) to a recording truck 145, where the measurement data can be captured as a record of seismic data. Note that the subterranean structure 105 can include multiple reflectors, some of which can include dipping events, and can generate multiple reflections (including wave conversion) for receipt by each of the seismic sensors 136.

Further, not all of the seismic waves propagate downward into the geological formation. Some of the seismic waves are surface waves that propagate along an interface between two media instead of through a medium. A surface wave can travel at the interface between the earth and air or the earth and a body of water. Surface waves can lead to ground roll noise (a type of surface noise). Ground roll noise is a type of coherent noise generated by a surface wave that can obscure signals reflected from the reflector 115 and can degrade the overall quality of the seismic data resulting from the survey. Examples of ground-roll noise include Rayleigh waves and Love waves. Other types of surface noise include flexural waves present in data acquired over frozen surfaces such as a body of water or permafrost. More generally, "surface noise" refers to unwanted noise traveling along a surface, such as a land surface.

Surface waves can be high-frequency waves, generated by the active seismic source 120. However, surface waves can also be predominantly generated by noise from the surrounding environment. For example, surrounding noise can come from natural phenomena, such as earthquakes and water movement. Surrounding noise can also come from human activity, such as road traffic, drilling, and the like.

As noted above, passive surveying can be configured to record seismic data continually during periods between active surveying. When the active seismic source 120 is not activated, the seismic sensors 136 can still record seismic data generated by the surrounding noise. In this manner, the passive surveying can record seismic data resulting from the surrounding noise, where the recorded passive seismic data can include contributions from various sources: surface noise (such as ground roll noise), body waves, and reflections from structures within the subterranean structure 105.

While the passive seismic data can provide relevant information about the subterranean structure 105, surface noise (such as ground roll noise) can be large enough such that it is difficult to separate the relevant information from the surface noise.

In accordance with some embodiments, data (referred to as "divergence data") collected by divergence sensors 138 that are also part of the sensor assemblies 135 is used for measuring a horizontally propagating noise (surface noise) along the ground surface 110. The divergence data can be used to attenuate noise in passive seismic data.

Figure 2:
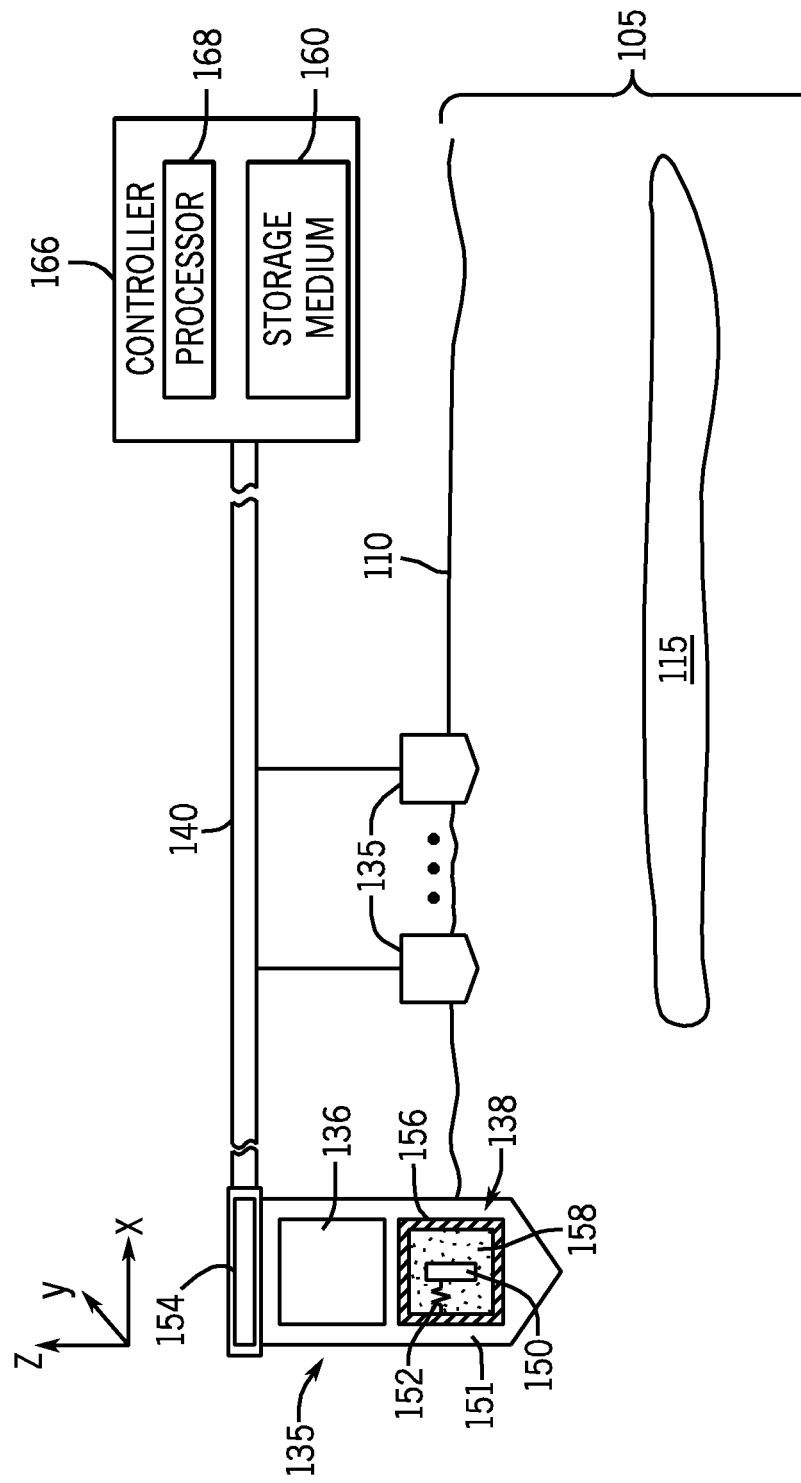

FIG. 2 shows further details regarding a divergence sensor 138 that is part of a sensor assembly 135. As shown in FIG. 2, the divergence sensor 138 has a closed container 156 that is sealed. The container 156 contains a volume of liquid 158 (or other material such as a gel, a solid such as plastic or sand, and so forth) inside the container 156. Moreover, the container 156 contains a pressure sensor 150 (e.g., a hydrophone) that is immersed in the liquid 158 (or other material). The pressure sensor 150 being immersed in the material 158 means that the pressure sensor 150 is surrounded by or otherwise attached to or in contact with the material 158. In the ensuing discussion, reference is made to the hydrophone 150 that is immersed in the liquid 150—note that in alternative embodiments, other types of pressure sensors 150 can be immersed in other types of material 158.

The hydrophone 150, which is neutrally buoyantly immersed in the liquid 158, is mechanically decoupled from the walls of the container 156. As a result, the hydrophone 150 is sensitive to just acoustic waves that are induced into the liquid 158 through the walls of the container 156. To maintain a fixed position, the hydrophone 150 is attached by a coupling mechanism 152 that dampens propagation of acoustic waves through the coupling mechanism 152. Examples of such a coupling mechanism 152 include elastic bands or a suitable arrangement of springs and/or dashpots, for example. Data from divergence sensors include measurements insensitive to a direction of wave propagation.

Examples of the liquid 158 include the following: kerosene, mineral oil, vegetable oil, silicone oil, and water. In other embodiments, other types of liquids can be employed. As yet another example, instead of a liquid, the hydrophone 150 is immersed in another type of material, such as gel, or a solid such as a plastic or sand. In some examples, a liquid with a higher viscosity can be used to change the sensitivity to different types of waves, including P (compression) waves, S (shear) waves, Rayleigh waves, and Love waves. Moreover, the amount of liquid 158 provided in the container 156 of the divergence sensor 138 determines the sensitivity of the hydrophone 150. A container 156 that is only partially filled with liquid records a weaker signal.

As further shown in FIG. 2, the sensor assembly 135 also includes electronic circuitry 154 that is electrically coupled to both the seismic sensor 136 and the divergence sensor 138. The electronic circuitry 154 can include storage elements, processing elements, and communications elements for communicating data acquired by the seismic sensor 136 and divergence sensor 138 over the electrical cable 140 to a controller 166, which can be part of the recording truck 145 of FIG. 1. The controller 166 includes a processor 168 (or multiple processors) and a storage medium 160.

As depicted in FIG. 2, the seismic sensor 136 is positioned above and external to the container 156 of the divergence sensor 138. In other implementations, the seismic sensor 136 can have another arrangement with respect to the divergence sensor 138. At least a portion of the divergence sensor 138 is below the ground surface 110, such that the hydrophone 150 is at or below the ground surface 110, but not above the ground surface 110. When planted, the divergence sensor 138 of the sensor assembly 135 is firmly in contact with the earth medium underneath the ground surface 110, which improves data quality of signals acquired by the hydrophone 150 in the divergence sensor 138.

In embodiments that employ the cable 140, power is provided from a remote power supply (such as a power supply located at the controller 166) through the cable 140 to the sensor assemblies 135. In embodiments that employ wireless communications and that do not use the cable 140, the sensor assembly 135 can be provided with batteries to provide local power.

As further shown in FIG. 2, the seismic sensor 136 and divergence sensor 138 are part of an overall shell or housing 151, such that the sensor assembly 135 can be considered to be a single sensor device. In an alternative embodiment, the seismic sensor 136 and divergence sensor 138 can be provided in different shells or housings, and each of the seismic sensor 136 and divergence sensor 138 can be associated with its own respective electronic circuitry, such that the sensor assembly 135 would be considered to be formed of two separate sensor devices. In such an implementation, the two separate sensor devices would be located relatively close together (such as less than one meter or some other distance apart).

Figure 3:
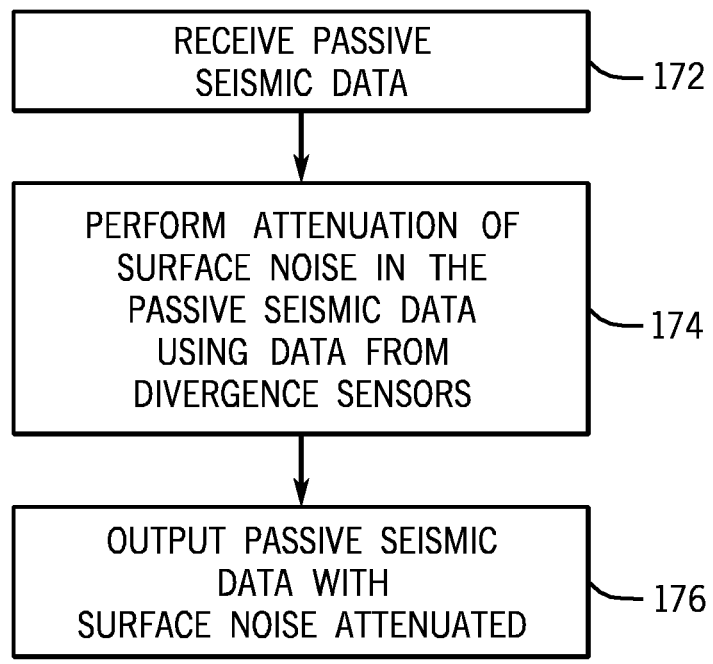
FIGS. 3-5 are flow diagrams of processes according to various embodiments.

FIG. 3 is a flow diagram of a process according to some embodiments. The process of FIG. 3 can be performed by the controller 166, for example. The controller 166 receives (at 172) passive seismic data collected from measurements of various seismic sensors 136 in respective sensor assemblies 135. The passive seismic data is based on multi-component measurements along two or more directions collected during periods when no active seismic source (such as 120 in FIG. 1) was activated.

The controller 166 performs (at 174) attenuation of surface noise in the passive seismic data using divergence data from divergence sensors in at least some of the sensor assemblies. As noted above, the divergence data from the divergence sensors represents the surface noise. To attenuate the surface noise in the passive seismic data, the divergence data from the divergence sensors can be subtracted from the passive seismic data. Alternatively, the divergence data can be combined with the passive seismic data using other techniques, such as discussed by in U.S. patent application Ser. No. 12/573,266, referenced above.

By using divergence data collected by the divergence sensors 138 to enable the removal of surface noise, without the need for well-sampled (i.e., unaliased) recording of surface noise. Arrays to achieve well-sampled recording of surface noise can add to the complexity of the arrays, which can increase survey costs and can be time consuming.

The controller 166 next outputs (at 176) the passive seismic data with surface noise attenuated to allow for an operation to be performed in relation to the subterranean structure 105 of FIG. 1 or 2. For example, the operation can include characterization of the subterranean structure 105 using the passive seismic data with the surface noise attenuated. Based on the characterization, the controller 166 can develop a subsurface image of the subterranean structure 105. Alternatively, the controller 166 can generate a model, such as a velocity model, of the subterranean structure 105 based on the passive seismic data with surface noise attenuated. As noted above, the generation of the image or model can employ passive seismic interferometry or another technique. As yet a further alternative, the passive seismic data can be used for passive data reservoir monitoring. Passive data reservoir monitoring refers to monitoring the progress of a reservoir in the subterranean structure 105 during an operation (e.g., production or injection) performed with respect to the reservoir.

The following discussion provides further details regarding performance of passive seismic interferometry according to some embodiments. As discussed, passive seismic interferometry can be used to produce an image of a subterranean structure or to produce a model of the subterranean structure. For improved performance, the passive seismic interferometry uses surface noise attenuation based on divergence data collected by divergence sensors 138 as discussed above.

In performing passive seismic interferometry, it is desired to recover reflection seismograms from recordings (in the form of passive seismic data) of ambient noise (when no active seismic source is active). Generally, passive seismic surveying causes recording of low-frequency seismic responses, while active seismic surveying causes recording of high-frequency seismic responses. There can be some overlap in the higher and lower frequency ranges associated with active and passive seismic surveys, respectively. Collected seismic data can be split between high and low frequencies, which can be based on a predefined threshold, such as a frequency threshold in the 4-5 Hz (hertz) range. In other implementations, other frequency thresholds can be used. For example, seismic waves at 5 Hz or less are considered to be low frequency waves.

Attempting to recover reflection seismograms from recordings of ambient noise can be difficult because passive seismic data at lower frequencies can be dominated by surface noise.

Figure 4:
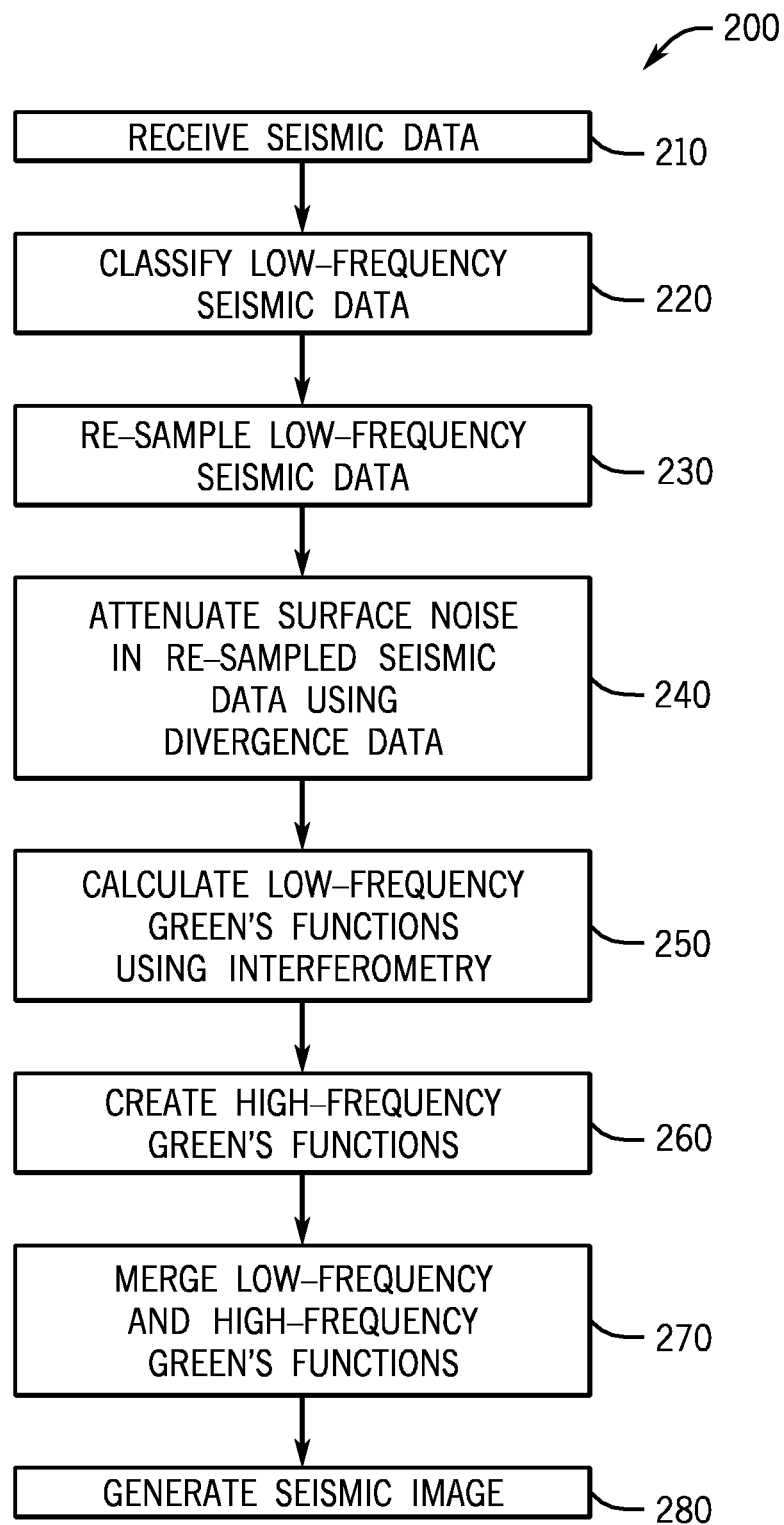

FIG. 4 is a flow chart of a technique 200 for generating a seismic image of the subterranean structure 105 using passive seismic interferometry in accordance with some implementations. Seismic data can be received (at 210) from two seismic sensors 136 in a seismic survey, for example. The received seismic data can include both active and passive seismic data. The seismic data resulting from the combination of active and passive surveying can include a broad spectrum of low and high-frequency acoustic waves.

Low-frequency seismic data can be classified (at 220). In some implementations, all seismic data that is below and equal to a predefined frequency threshold $f_{min}$ (e.g., 5 Hz) can be classified as low-frequency seismic data. While 5 Hz is used as an example here, it should be understood that other predetermined frequencies can instead be used to distinguish low-frequency seismic data. Here, the predetermined frequency threshold is referred to as $f_{min}$.

The seismic data at $f_{min}$ (or in a range containing $f_{min}$), e.g., 5 Hz, can be classified as both high and low-frequency. In implementations of various techniques described herein, the seismic data that overlaps between high and low-frequency can be used to generate a velocity model. The velocity model generation is described in greater detail with reference to FIG. 5.

The low-frequency seismic data can be re-sampled (at 230) based on $f_{min}$. The amount of recorded seismic data can be large. Therefore, in some implementations, a re-sampling of the low-frequency seismic data can be used to generate the seismic image.

The low-frequency seismic data can be re-sampled according to a time interval and a spatial interval. In other words, seismic data recorded at each time interval can be used in the re-sampling. Similarly, seismic data recorded at each spatial interval can be used in the re-sampling. The time interval can be based on $f_{min}$ and a Nyquist sampling theorem. In some implementations, the time interval, dt, can be determined according to the following formula:

$$dt < \frac{1}{2 * f\min}$$

The spatial interval can be based on $f_{min}$, a Nyquist sampling theorem, and vmin, where vmin can represent the frequency of the ground roll noise. In some implementations, the spatial interval, dx, can be determined according to the following formula:

$$dx < \frac{v\min}{2 * f\min}$$

Surface noise in the re-sampled low-frequency seismic data can be attenuated (at 240). The attenuation is based on the divergence data from the divergence sensors 138 depicted in FIG. 2.

A set of low-frequency Green's functions can be calculated (at 250) using interferometry on the attenuated low-frequency seismic data. The set of low-frequency Green's function can describe the impulse responses at a pair of sensors. In the implementation where attenuation is optional, the set of low-frequency Green's functions can be calculated using Interferometry on the re-sampled low-frequency seismic data. An example of the Green's function for two seismic sensors at locations, $x_1$ and $x_2$ is as follows:

$$(G(x1,x2,t)+G(x1,x2,-t)*a(t) \approx \Sigma(v(x1,-t)*v(x2,t))$$

where $v(x1, t)$ and $v(x2, t)$ represents vertical component noise records recorded at locations $x_1$ and $x_2$; $G(x_1, x_2, t)$ can be the Green's function between locations $x_1$ and $x_2$ corresponding to a recorded particle velocity at $x_2$ and a vertical point force (impulse) at $x_1$; and $a(t)$ can be the auto-correlation of the source time function of all noise records. Although implementations of various techniques have been described with reference to continuous seismic recording, it should be understood that some implementations contemplate breaks or pauses between seismic recordings. Regardless, all records that are included in the sum come from the same locations and are recorded simultaneously across the sensors. Additionally, in some implementations, the formula above can be generalized to other source types and other recorded quantities such as horizontal components of particle velocity.

Interferometry is a technique of constructing Green's functions between pairs of points. One sensor can be located at each of the points. For each pair of sensors in the attenuated low-frequency seismic data, a seismic data set can be produced for one of the pair. The seismic data set produced can represent reflected waves from a virtual source. In other words, the other of the pair of seismic sensors is treated as the source. The full set of seismic data produced for every sensor pair is referred as an interferometric reflection seismic data set.

High frequency seismic data can be processed (at 260) to create a set of high-frequency Green's functions. The high-frequency seismic data can be from the active seismic survey data that is at or above $f_{min}$ described above.

The set of low-frequency Green's functions can be merged (at 270) with the set of high-frequency Green's functions. By merging the low and high frequencies, a set of broadband Green's functions can be created.

In some implementations, a regularization process can be used to perform the merger. The regularization process can interpolate the virtual source locations of the set of low-frequency Green's functions to locations of actual sources in the set of high-frequency Green's functions. The overlapping data in the $f_{min}$ frequency band can also be used to tie and calibrate the sets of high and low-frequency Green's functions to each other.

Next, a seismic image can be generated (at 280) of the subterranean structure 105. The image can be generated using the set of broadband Green's functions.

Alternatively, the set of broadband Green's functions can also be used to generate a velocity model of the subterranean structure 105. In some implementations, the velocity model can be generated using a full waveform inversion procedure. The full waveform inversion procedure can be an iterative process that uses a range of frequencies within the set of broadband Green's functions to produce the velocity model. A low frequency (below $f_{min}$) can be selected within the set of broadband Green's functions. Seismic data at the selected frequency can be inverted to generate a low-resolution model that fits the seismic data at the selected frequency.

A higher frequency can then be selected. The seismic data at the higher frequency can then be inverted with the low-resolution velocity model to generate a higher resolution model. The process can then be repeated, using seismic data from progressively higher frequencies and each progressively generated model, until a velocity model of desired resolution is generated.

To generate the seismic image, the set of high-frequency Green's functions can be imaged by performing a reverse time migration using the velocity model and the set of high-frequency Green's functions.

Figure 5:
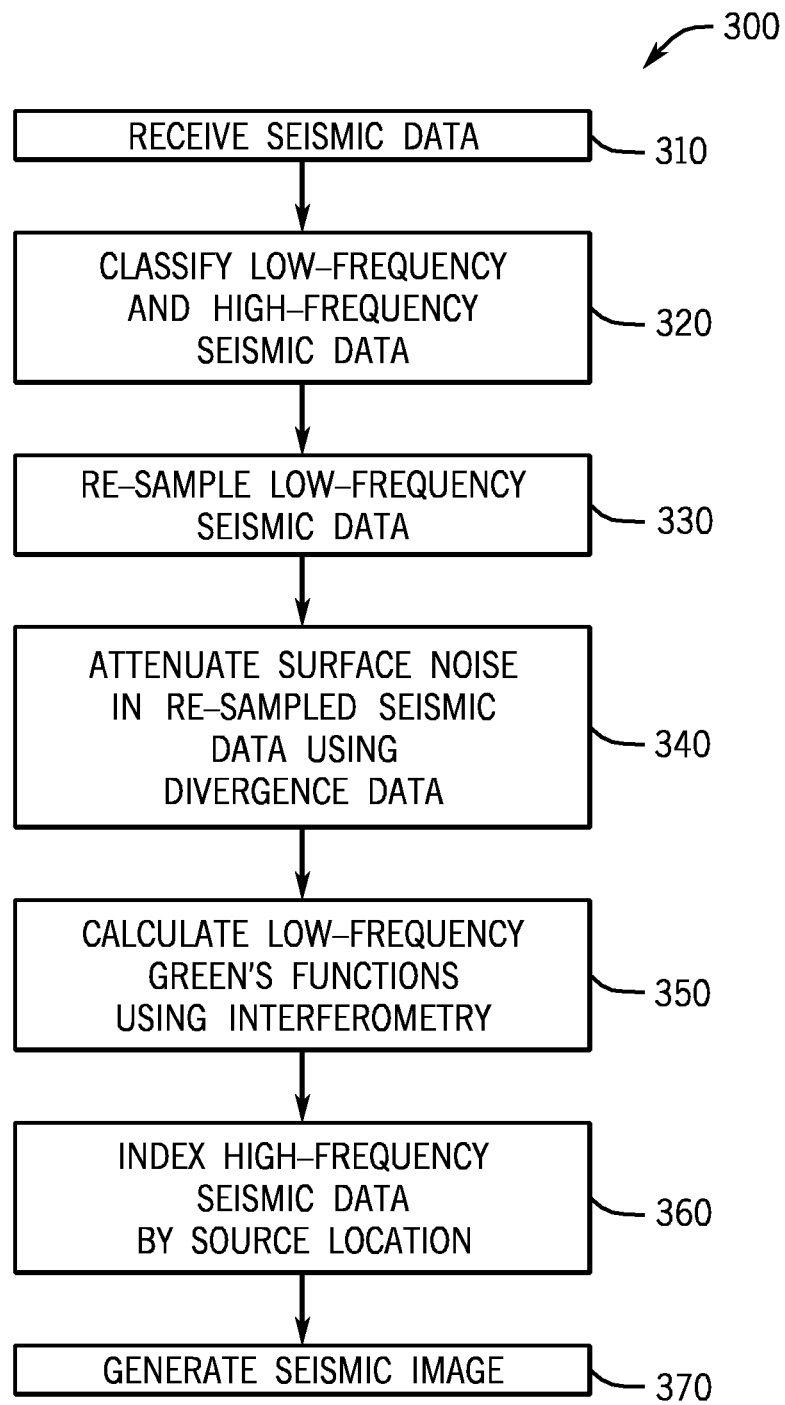

FIG. 5 is a flow chart of a technique 300 for generating a seismic image of the subterranean structure 105 in accordance with further implementations. With exception of task 320, tasks 310-350 of technique 300 are the same as respective tasks 210-250 in technique 200 of FIG. 4. In task 320, in addition to the classification of low-frequency seismic data, a classification of high-frequency seismic data is also performed. Seismic data that is at or above $f_{min}$ is classified as the high-frequency seismic data.

The high-frequency seismic data can be indexed (at 360) by the locations of the sources of the high-frequency seismic data. The sources can be the sources of the active surveying. The indexed data is referred to herein as an active source seismic dataset.

A seismic image can be generated (at 370) using the active source seismic dataset and the set of low-frequency Green's functions. In some implementations, the seismic image is generated by performing the full waveform inversion described above. Alternatively, the seismic image can be generated using a prestack depth migration, or an impedance inversion.

The tasks depicted in FIGS. 3-5 can be performed by machine-readable instructions that are loaded for execution on a processor (such as processor(s) 168 in FIG. 2). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations can be practiced without some or all of these details. Other implementations can include modifications and variations from the details discussed above. It is intended that the appended claims cover such modifications and variations.

What is claimed is:

1. A method comprises:
   receiving, by a system having a processor, passive seismic data collected from measurements of seismic sensors in respective sensor assemblies, wherein the passive seismic data is based on multi-component measurements along two or more directions collected during periods when no active seismic source was activated;

performing, by the system, attenuation of ground-roll noise in the passive seismic data using data from divergence sensors in at least some of the sensor assemblies, the data from the divergence sensors comprising measurements insensitive to a direction of wave propagation, wherein each of the divergence sensors includes a container containing a material and a pressure sensor immersed in the material, the divergence sensor and the seismic sensor of each of the at least some sensor assemblies are collocated, and the divergence sensors are buried below a ground surface and a portion of each of the at least some sensor assemblies including the respective divergence sensor is in contact with an earth medium underneath the ground surface; and outputting, by the system, the passive seismic data with the ground-roll noise attenuated to allow for performing an operation related to a subterranean structure using the passive seismic data with the ground-roll noise attenuated.

2. The method of claim 1, further comprising:
using the passive seismic data with the ground-roll noise attenuated to develop a subsurface image of the subterranean structure.

3. The method of claim 1, further comprising:
using the passive seismic data with the ground-roll noise attenuated to develop a model of the subterranean structure.

4. The method of claim 1, further comprising:
using the passive seismic data with the ground-roll noise attenuated to perform passive seismic interferometry.

5. The method of claim 4, wherein performing the passive seismic interferometry comprises:
classifying the passive seismic data as seismic data below a predefined frequency threshold.

6. The method of claim 5, wherein performing the passive seismic interferometry comprises calculating a set of Green's functions based on the passive seismic data, the method further comprising using the set of Green's functions to produce an image of the subterranean structure.

7. The method of claim 1, further comprising:
using the passive seismic data with the ground-roll noise attenuated to perform passive data reservoir monitoring to monitor a reservoir in a subterranean structure.

8. The method of claim 1, further comprising:
receiving the data from the divergence sensors.

9. The method of claim 1, wherein the material includes liquid.

10. An article comprising at least one non-transitory machine-readable storage medium storing instructions that upon execution cause a system having a processor to:
receive seismic data collected from measurements of seismic sensors in respective sensor assemblies;
identify passive seismic data in the received seismic data, wherein the passive seismic data is based on multi-component measurements along two or more directions collected by the seismic sensors during periods when no active seismic source was activated;
perform attenuation of ground-roll noise in the passive seismic data using data from divergence sensors in at least some of the sensor assemblies, the data from the divergence sensors comprising measurements insensitive to a direction of wave propagation, wherein each of the divergence sensors includes a container containing a material and a pressure sensor immersed in the material, the divergence sensor and the seismic sensor of each of the at least some sensor assemblies are collocated, and the divergence sensors are buried below a ground surface and a portion of each of the at least some sensor assemblies including the respective divergence sensor is in contact with an earth medium underneath the ground surface; and
perform an operation related to a subterranean structure using the passive seismic data with the ground-roll noise attenuated.

11. The article of claim 10, wherein the operation includes generating an image of the subterranean structure.

12. The article of claim 10, wherein the operation includes generating a model of the subterranean structure.

13. The article of claim 12, wherein the model is a velocity model.

14. The article of claim 10, wherein the operation includes reservoir monitoring of a reservoir in the subterranean structure.

15. A system comprising:
sensor assemblies, wherein at least some of the sensor assemblies each includes a seismic sensor and a divergence sensor; and
a controller to:
receive passive seismic data collected from measurements of the seismic sensors, wherein the passive seismic data is based on multi-component measurements along two or more directions collected during periods when no active seismic source was activated;
perform attenuation of ground-roll noise in the passive seismic data using data from the divergence sensors, the data from the divergence sensors comprising measurements insensitive to a direction of wave propagation, wherein each of the divergence sensors includes a container containing a material and a pressure sensor immersed in the material, the divergence sensor and the seismic sensor of each of the at least some sensor assemblies are collocated, and the divergence sensors are buried below a ground surface and a portion of each of the at least some sensor assemblies including the respective divergence sensor is in contact with an earth medium underneath the ground surface; and
output the passive seismic data with the ground-roll noise attenuated to allow for performing an operation related to a subterranean structure using the passive seismic data with the ground-roll noise attenuated.

16. The system of claim 15, wherein the material includes liquid.

17. The system of claim 15, wherein the operation is selected from the group consisting of: generating an image of the subterranean structure; generating a model of the subterranean structure; performing passive seismic interferometry; and performing reservoir monitoring.

18. The method of claim 15, wherein each of the at least some sensor assemblies includes a housing containing the corresponding seismic sensor and divergence sensor.

* * * * *